US008706867B2

(12) United States Patent
Vijayan

(10) Patent No.: US 8,706,867 B2
(45) Date of Patent: Apr. 22, 2014

(54) REALTIME STREAMING OF MULTIMEDIA CONTENT FROM SECONDARY STORAGE DEVICES

(75) Inventor: Manoj Kumar Vijayan, Marlboro, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 77 days.

(21) Appl. No.: 13/076,740

(22) Filed: Mar. 31, 2011

(65) Prior Publication Data
US 2012/0254364 A1  Oct. 4, 2012

(51) Int. Cl.
*G06F 15/173* (2006.01)

(52) U.S. Cl.
USPC .... 709/224; 709/219; 709/209; 707/999.102; 707/102; 707/200; 713/201

(58) Field of Classification Search
USPC .............................. 709/209, 224; 707/999.102
See application file for complete search history.

(56) References Cited

U.S. PATENT DOCUMENTS

| | | |
|---|---|---|
| 4,686,620 A | 8/1987 | Ng |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,448,724 A | 9/1995 | Hayashi |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |

(Continued)

FOREIGN PATENT DOCUMENTS

| | | |
|---|---|---|
| EP | 0259912 A1 | 3/1988 |
| EP | 0405926 A2 | 1/1991 |

(Continued)

OTHER PUBLICATIONS

U.S. Appl. No. 13/250,962, filed Sep. 30, 2011, Kottomtharayil.

(Continued)

*Primary Examiner* — Kyung H Shin
(74) *Attorney, Agent, or Firm* — Perkins Coie LLP

(57) ABSTRACT

A method and system for streaming media to a client from a media server is described. In some examples, the system utilizes a virtualization layer to generate a virtual computing environment, or virtual machine, at a UPnP server, which is configured to receive requests for media, identify locations for the media within the secondary storage devices, access the media, and present the media to a client computing device associated with the media requests.

22 Claims, 6 Drawing Sheets

(56) References Cited

U.S. PATENT DOCUMENTS

| | | |
|---|---|---|
| 5,559,957 A | 9/1996 | Balk |
| 5,619,644 A | 4/1997 | Crockett et al. |
| 5,638,509 A | 6/1997 | Dunphy et al. |
| 5,673,381 A | 9/1997 | Huai et al. |
| 5,699,361 A | 12/1997 | Ding et al. |
| 5,729,743 A | 3/1998 | Squibb |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,950,205 A | 9/1999 | Aviani, Jr. |
| 5,974,563 A | 10/1999 | Beeler, Jr. |
| 6,021,415 A | 2/2000 | Cannon et al. |
| 6,026,414 A | 2/2000 | Anglin |
| 6,052,735 A | 4/2000 | Ulrich et al. |
| 6,076,148 A | 6/2000 | Kedem |
| 6,094,416 A | 7/2000 | Ying |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,389,432 B1 | 5/2002 | Pothapragada et al. |
| 6,421,711 B1 | 7/2002 | Blumenau et al. |
| 6,487,561 B1 | 11/2002 | Ofek et al. |
| 6,519,679 B2 | 2/2003 | Devireddy et al. |
| 6,538,669 B1 | 3/2003 | Lagueux, Jr. et al. |
| 6,564,228 B1 | 5/2003 | O'Connor |
| 6,581,076 B1 | 6/2003 | Ching et al. |
| 6,658,526 B2 | 12/2003 | Nguyen et al. |
| 7,035,880 B1 | 4/2006 | Crescenti et al. |
| 7,076,270 B2 | 7/2006 | Jaggers et al. |
| 7,219,162 B2 | 5/2007 | Donker et al. |
| 7,246,207 B2 | 7/2007 | Kottomtharayil et al. |
| 7,395,282 B1 | 7/2008 | Crescenti et al. |
| 7,448,079 B2 * | 11/2008 | Tremain ............... 726/14 |
| 7,631,351 B2 | 12/2009 | Erofeev |
| 7,730,035 B2 | 6/2010 | Berger et al. |
| 7,756,835 B2 | 7/2010 | Pugh |
| 7,756,964 B2 | 7/2010 | Madison, Jr. et al. |
| 7,840,537 B2 | 11/2010 | Gokhale et al. |
| 7,882,077 B2 | 2/2011 | Gokhale et al. |
| 7,899,788 B2 | 3/2011 | Chandhok et al. |
| 8,069,271 B2 | 11/2011 | Brunet et al. |
| 2002/0069369 A1* | 6/2002 | Tremain ............... 713/201 |
| 2004/0153479 A1* | 8/2004 | Mikesell et al. ....... 707/200 |
| 2006/0224846 A1 | 10/2006 | Amarendran et al. |
| 2007/0203938 A1* | 8/2007 | Prahlad et al. ......... 707/102 |
| 2007/0234302 A1 | 10/2007 | Suzuki et al. |
| 2008/0229037 A1 | 9/2008 | Bunte et al. |
| 2008/0244177 A1 | 10/2008 | Crescenti et al. |
| 2009/0144416 A1* | 6/2009 | Chatley et al. ......... 709/224 |
| 2009/0319534 A1 | 12/2009 | Gokhale |
| 2009/0319585 A1 | 12/2009 | Gokhale |
| 2009/0327471 A1 | 12/2009 | Astete et al. |
| 2010/0070725 A1 | 3/2010 | Prahlad et al. |
| 2010/0242096 A1 | 9/2010 | Varadharajan et al. |
| 2010/0332454 A1 | 12/2010 | Prahlad et al. |
| 2011/0087632 A1 | 4/2011 | Subramanian et al. |
| 2011/0093471 A1 | 4/2011 | Brockway et al. |
| 2013/0061014 A1 | 3/2013 | Prahlad et al. |

FOREIGN PATENT DOCUMENTS

| | | |
|---|---|---|
| EP | 0467546 A2 | 1/1992 |
| EP | 0774715 A1 | 5/1997 |
| EP | 0809184 A1 | 11/1997 |
| EP | 0899662 A1 | 3/1999 |
| EP | 0981090 A1 | 2/2000 |
| WO | WO-9513580 A1 | 5/1995 |
| WO | WO-9912098 A1 | 3/1999 |

OTHER PUBLICATIONS

Armstead et al., "Implementation of a Campus-wide Distributed Mass Storage Service: The Dream vs. Reality," *IEEE*, 1995, pp. 190-199.

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," *IEEE*, 1994, pp. 124-126.

Jander, M., "Launching Storage-Area Net," *Data Communications*, US, McGraw Hill, NY, vol. 27, No. 4 (Mar. 21, 1998), pp. 64-72.

Jason Gait, "The Optical File Cabinet: A Random-Access File System for Write-Once Optical Disks," *IEEE Computer*, vol. 21, No. 6, pp. 11-22 (1988) (see in particular figure 5 in p. 15 and recitation in claim 5).

Rosenblum et al., "The Design and Implementation of a Log-Structured File System," *Operating Systems Review SIGOPS*, vol. 25, No. 5, New York, US, pp. 1-15 (May 1991).

U.S. Appl. No. 13/765,389, filed Feb. 12, 2013, Kripalani.
U.S. Appl. No. 13/789,871, filed Mar. 8, 2013, Kumarasamy et al.
U.S. Appl. No. 13/790,028, filed Mar. 8, 2013, Kumarasamy et al.
U.S. Appl. No. 13/790,226, filed Mar. 8, 2013, Sancheti et al.
U.S. Appl. No. 13/926,332, filed Jun. 25, 2013, Dwarampudi et al.

Brandon, J., "Virtualization Shakes Up Backup Strategy," <http://www.computerworld.com>, internet accessed on Mar. 6, 2008, 3 pages.

CommVault Systems, Inc., "A CommVault White Paper: VMware Consolidated Backup (VCB) Certification Information Kit," 2007, 23 pages.

CommVault Systems, Inc., "CommVault Solutions—VMware," <http://www.commvault.com/solutions/vmware/>, internet accessed Mar. 24, 2008, 2 pages.

CommVault Systems, Inc., "Enhanced Protection and Manageability of Virtual Servers," Partner Solution Brief, 2008, 6 pages.

Davis, D., "3 VMware Consolidated Backup (VCB) Utilities You Should Know," Petri IT Knowlegebase, <http://www.petri.co.il/vmware-consolidated-backup-utilities.htm>, internet accessed on Jul. 14, 2008, 7 pages.

Davis, D., "Understanding VMware VMX Configuration Files," Petri IT Knowledgebase, <http://www.petri.co.il/virtual_vmware_vmx_configuration_files.htm>, internet accessed on Jun. 19, 2008, 6 pages.

Davis, D., "VMware Server & Workstation Disk Files Explained," Petri IT Knowledgebase, <http://www.petri.co.il/virtual_vmware_files_explained.htm>, internet accessed on Jun. 19, 2008, 5 pages.

Davis, D., "VMware Versions Compared," Petri IT Knowledgebase, <http://www.petri.co.il/virtual_vmware_versions_compared.htm>, internet accessed on Apr. 28, 2008, 6 pages.

International Search Report and Written Opinion for PCT/US2011/054374, dated May 2, 2012, 9 pages.

(56) References Cited

OTHER PUBLICATIONS

International Preliminary Report on Patentability and Written Opinion for PCT/US2011/054374, dated Apr. 11, 2013, 6 pages.

Microsoft Corporation, "How NTFS Works," Windows Server TechCenter, updated Mar. 28, 2003, internet accessed Mar. 26, 2008, 26 pages.

Sanbarrow.com, "Disktype-table," <http://sanbarrow.com/vmdk/disktypes.html>, internet accessed on Jul. 22, 2008, 4 pages.

Sanbarrow.com, "Files Used by a VM," <http://sanbarrow.com/vmx/vmx-files-used-by-a-vm.html>, internet accessed on Jul. 22, 2008, 2 pages.

Sanbarrow.com, "Monolithic Versus Split Disks," <http://sanbarrow.com/vmdk/monolithicversusspllit.html>, internet accessed on Jul. 14, 2008, 2 pages.

VMware, Inc., "Open Virtual Machine Format," <http://www.vmware.com/appliances/learn/ovf.html>, internet accessed on May 6, 2008, 2 pages.

VMware, Inc., "OVF, Open Virtual Machine Format Specification, version 0.9," White Paper, <http://www.vmware.com>, 2007, 50 pages.

VMware, Inc., "The Open Virtual Machine Format Whitepaper for OVF Specification, version 0.9," White Paper, <http://www.vmware.com>, 2007, 16 pages.

VMware, Inc., "Understanding VMware Consolidated Backup," White Paper, <http://www.vmware.com>, 2007, 11 pages.

VMware, Inc., "Using VMware Infrastructure for Backup and Restore," Best Practices, <http://www.vmware.com>, 2006, 20 pages.

VMware, Inc., "Virtual Disk API Programming Guide," <http://www.vmware.com>, Revision 20080411, 2008, 44 pages.

VMware, Inc., "Virtual Disk Format 1.1," VMware Technical Note, <http://www.vmware.com>, Revision 20071113, Version 1.1, 2007, 18 pages.

VMware, Inc., "Virtualized iSCSI SANS: Flexible, Scalable Enterprise Storage for Virtual Infrastructures," White Paper, <http://www.vmware.com>, Mar. 2008, 13 pages.

VMware, Inc., "Virtual Machine Backup Guide, ESX Server 3.5, ESX Server 3i version 3.5, VirtualCenter 2.5," <http://www.vmware.com>, updated Feb. 21, 2008, 78 pages.

VMware, Inc., "Virtual Machine Backup Guide, ESX Server 3.0.1 and VirtualCenter 2.0.1," <http://www.vmware.com>, updated Nov. 21, 2007, 74 pages.

VMware, Inc., "VMware Consolidated Backup," Product Datasheet, <http://www.vmware.com>, 2007, 2 pages.

VMware, Inc., "VMware Consolidated Backup, Improvements in Version 3.5," Information Guide, <http://www.vmware.com>, 2007, 11 pages.

VMware, Inc., "VMware ESX 3.5," Product Datasheet, <http://www.vmware.com>, 2008, 4 pages.

VMware, Inc., "VMware GSX Server 3.2, Disk Types: Virtual and Physical," <http://www.vmware.com/support/gsx3/doc/disks_types_gsx.html>, internet accessed on Mar. 25, 2008, 2 pages.

VMware, Inc., "VMware OVF Tool," Technical Note, <http://www.vmware.com>, 2007, 4 pages.

VMware, Inc., "VMware Workstation 5.0, Snapshots in a Process Tree," <http://www.vmware.com/support/ws5/doc/ws_preserve_sshot_tree.html>, internet accessed on Mar. 25, 2008, 1 page.

VMware, Inc., "VMware Workstation 5.0, Snapshots in a Linear Process," <http:/www.vmware.com/support/ws5/doc/ws_preserve_sshot_linear.html>, internet accessed on Mar. 25, 2008, 1 page.

VMware, Inc., "VMware Workstation 5.5, What Files Make Up a Virtual Machine?" <http://www.vmware.com/support/ws55/doc/ws_learning_files_in_a_vm.html>, internet accessed on Mar. 25, 2008, 2 pages.

Wikipedia, "Cluster (file system)," <http://en.wikipedia.org/wiki/Cluster_%28file_system%29>, internet accessed Jul. 25, 2008, 1 page.

Wikipedia, "Cylinder-head-sector," <http://en.wikipedia.org/wiki/Cylinder-head-sector>, internet accessed Jul. 22, 2008, 6 pages.

Wikipedia, "File Allocation Table," <http://en.wikipedia.org/wiki/File_Allocation_Table>, internet accessed on Jul. 25, 2008, 19 pages.

Wikipedia, "Logical Disk Manager," <http://en.wikipedia.org/wiki/Logical_Disk_Manager>, internet accessed Mar. 26, 2008, 3 pages.

Wikipedia, "Logical Volume Management," <http://en.wikipedia.org/wiki/Logical_volume_management>, internet accessed on Mar. 26, 2008, 5 pages.

Wikipedia, "Storage Area Network," <http://en.wikipedia.org/wiki/Storage_area_network>, internet accessed on Oct. 24, 2008, 5 pages.

Wikipedia, "Virtualization," <http://en.wikipedia.org/wiki/Virtualization>, internet accessed Mar. 18, 2008, 7 pages.

* cited by examiner

REALTIME STREAMING OF MULTIMEDIA CONTENT FROM SECONDARY STORAGE DEVICES

CROSS-REFERENCE TO RELATED APPLICATIONS

This application is related to U.S. patent application Ser. No. 12/553,294, filed on Sep. 3, 2009, entitled SYSTEMS AND METHODS FOR MANAGEMENT OF VIRTUALIZATION DATA, which is incorporated by reference in its entirety.

BACKGROUND

Consumers of media are rapidly moving away from using traditional media applications, such as media players that play physical media, to digital media applications, such as content providers that offer streaming of media in real time. For example, content providers such as Hulu.com, Amazon.com, iTunes, and others, provide users with access to a huge library of images, television shows, movies, podcasts, and so on, presenting the media to the users by streaming content from their servers to the user's computing devices. Among a variety of systems, Universal Plug and Play (UPnP) systems enable these content providers, such as providers of music, movies, images, and so on, to easily stream media to user devices remotely located from UPnP servers of the content providers, by utilizing UPnP protocols to facilitate searching and retrieving media from the servers.

Typically, in order to provide users with fast, reliable streaming of desired media, a content provider stores available media files at the a UPnP server, or more specifically, a UPnP AV server. Although storing the media at the server, or at primary storage locations associated with the server, enables for a reliable streaming of media from the server, such storage is expensive to purchase, maintain, and power, which can limit the variety of media offered to users by a content provider. There is a need for a system that overcomes the above problems, as well as providing additional benefits.

DETAILED DESCRIPTION

Overview

Figure 1:
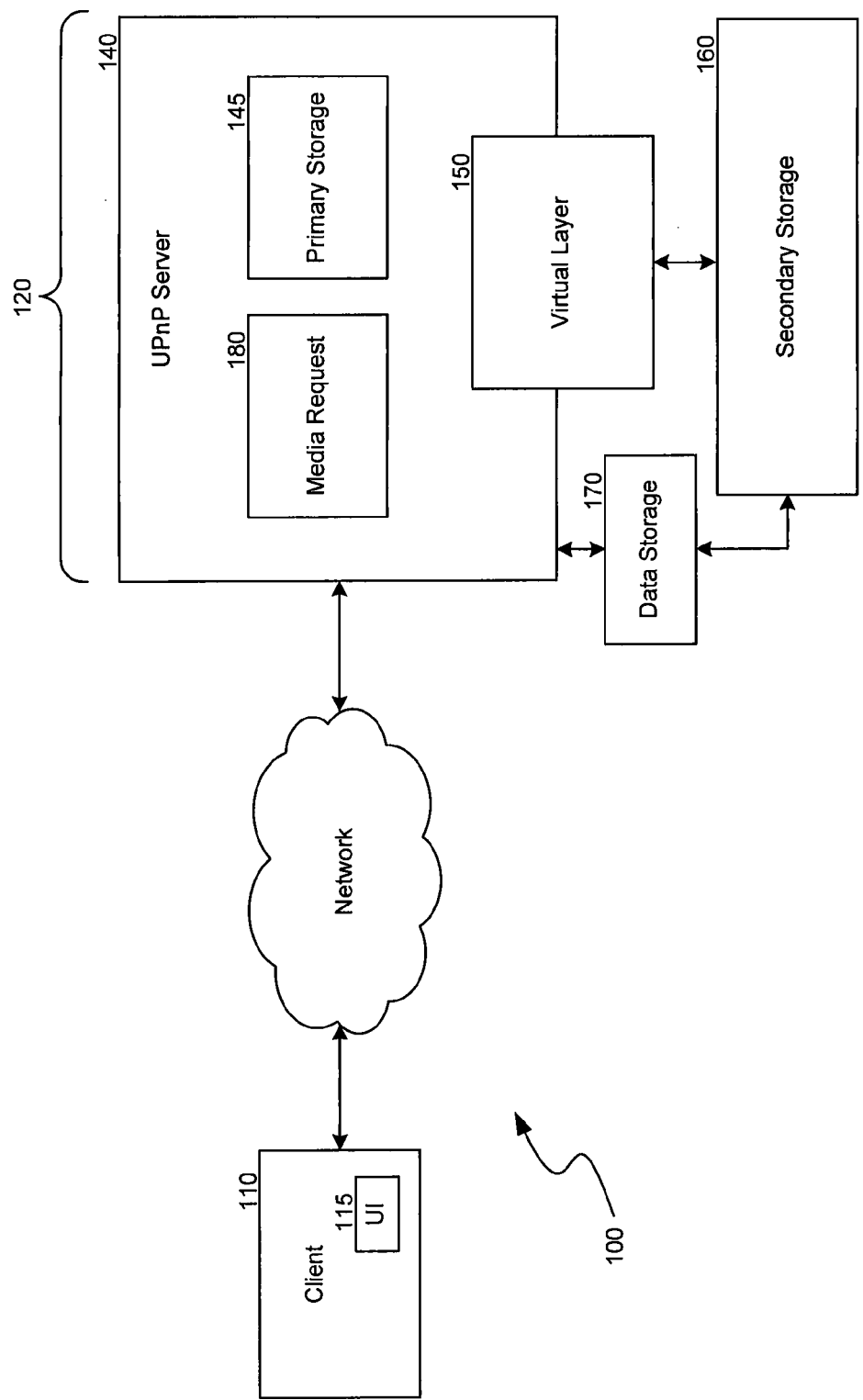
FIG. 1 is a block diagram illustrating a computing environment in which aspects of the system may be implemented.

A method and system for providing real time streaming of media stored in secondary storage devices via a media server, such as a Universal Plug and Play (UPnP) server, is described. In some examples, the system utilizes a virtualization layer to generate a virtual computing environment, or virtual machine, at the UPnP server, which is configured to receive requests for media, identify locations for the media within the secondary storage devices, access the media, and present the media to a client computing device associated with the media requests.

In some examples, the system transfers portions of requested media located in secondary storage, such as archive storage, to a client computing device via a virtual environment hosted by a UPnP server. For example, the system may transfer a portion of a requested movie via the UPnP server from archive storage to the client computing device, and after a certain time period, transfer one or more additional portions of the request movie from the archive storage to the client computing device. In some cases, the system transfers additional portions of a media file based on input received at the client computing device. For example, the client computing device may receive a first portion of a movie file, corresponding to a beginning section of the movie, in response to a user selecting a play function at the client computing device, and wait to transfer a second or subsequent portion until additional input (e.g., a skip or forward command) is received at the client computing device. The system may perform such sectioned or incremental streaming of media in order to provide desired media from archive storage to a user without streaming extraneous or unwanted portions of a media file, reducing the impact on the server and the storage devices, among other benefits.

In some examples, the system may automatically manage the storage locations of media offered by a content provider. The system may set certain rules or parameters that govern or define retention criteria for media within the system. For example, the system may store and maintain highly requested media files within high cost, primary storage devices, while moving or migrating less requested media files to cheaper secondary storage devices. Thus, the system, by enabling efficient, fast, and reliable streaming of media located in secondary storage devices as well as primary storage devices, enables content providers to maintain a larger inventory of media available to users, and enables content providers to automatically modify the locations in which media is stored to optimize the overall delivery of media to their customers, among other benefits.

The system will now be described with respect to various embodiments. The following description provides specific details for a thorough understanding of, and enabling description for, these embodiments of the system. However, one skilled in the art will understand that the system may be practiced without these details. In other instances, well-known structures and functions have not been shown or described in detail to avoid unnecessarily obscuring the description of the embodiments of the system.

The terminology used in the description presented below is intended to be interpreted in its broadest reasonable manner, even though it is being used in conjunction with a detailed description of certain specific embodiments of the system. Certain terms may even be emphasized below; however, any terminology intended to be interpreted in any restricted manner will be overtly and specifically defined as such in this Detailed Description section.

Suitable System

Figure 2:
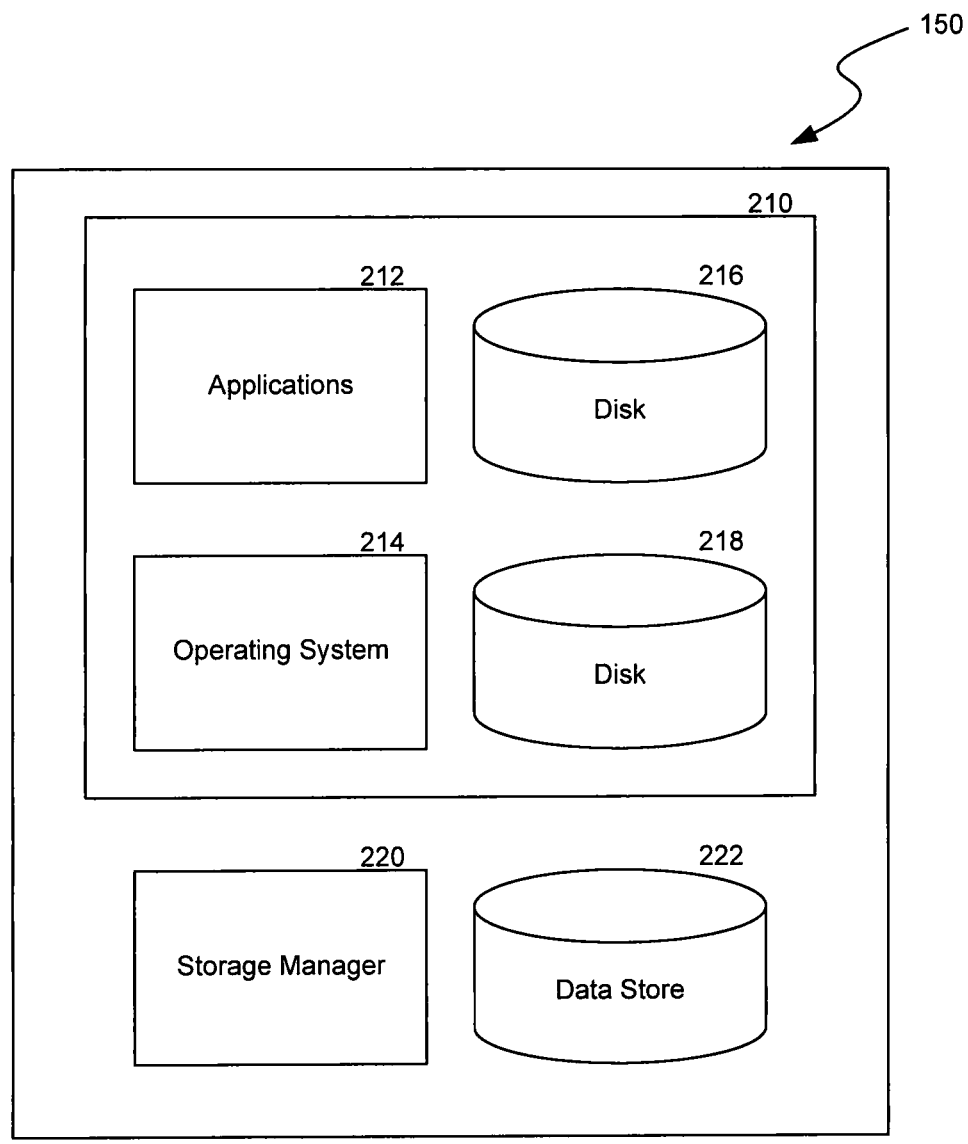
FIG. 2 is a block diagram illustrating a virtualization layer in which aspects of the system may be implemented.

FIGS. 1 and 2 and the following discussion provide a brief, general description of a suitable computing environment in which the system can be implemented. Although not required, aspects of the system are described in the general context of computer-executable instructions, such as routines executed by a general-purpose computer, e.g., a server computer, wireless device or personal computer. Those skilled in the relevant art will appreciate that the system can be practiced with other communications, data processing, or computer system configurations, including: Internet appliances, network PCs, mini-computers, mainframe computers, and the like. Indeed, the terms "computer," "host," and "host computer" are generally used interchangeably herein, and refer to any of the above devices and systems, as well as any data processor.

Aspects of the system can be embodied in a special purpose computer or data processor that is specifically programmed, configured, or constructed to perform one or more of the computer-executable instructions explained in detail herein. Aspects of the system can also be practiced in distributed computing environments where tasks or modules are performed by remote processing devices, which are linked through a communications network, such as a Local Area Network (LAN), Wide Area Network (WAN), Storage Area Network (SAN), Fibre Channel, or the Internet. In a distributed computing environment, program modules may be located in both local and remote memory storage devices.

Aspects of the system may be stored or distributed on computer-readable media, including magnetically or optically readable computer discs, hard-wired or preprogrammed chips (e.g., EEPROM semiconductor chips), nanotechnology memory, biological memory, or other data storage media. Indeed, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme). Those skilled in the relevant art will recognize that portions of the system reside on a server computer, while corresponding portions reside on a client computer, and thus, while certain hardware platforms are described herein, aspects of the system are equally applicable to nodes on a network.

FIG. 1 is a block diagram illustrating a computing environment 100 in which aspects of the system may be implemented. The computing environment 100 includes a client computing device 110 that communicates over a network 130 with a server 140 located within a computing system 120 associated with a content provider, such as a provider of digital media. The client computing device 110, which may be a laptop, mobile device, tablet computer, set top box, or any other device capable of receiving and presenting media streamed to the client computing device 110 from the server 140, transmits requests to the server 140 for media desired by users associated with the client computing device 110. For example, the client computing device 110 may provide a web interface 115 to a user that facilitates receiving input from the user related to selecting media, navigating within media, browsing or searching for media offered by the content provider, and so on. Upon receipt of user input the client computing device 110 sends requests to the server based on input, to be fulfilled by the server 140.

The server 140 that receives and fulfills the requests originating at the client computing device 110 may be a media server, such as a UPnP AV media server, or another media server capable of serving or streaming digital media in real time over the network 130 to the client computing device 110. For example, the UPnP server is a device capable of sharing and storing digital media, such as photographs, movies, or Music, with devices over a network, using UPnP protocols to communicate with the other devices. For example, a UPnP AV media server provides services to UPnP AV client devices or "control points," such as client computing device 110, that enable browsing of media content located to available to the server and fulfilling requests for the media content to be played on the client devices. UPnP AV media servers are available on a variety of operating systems (e.g., BSD, Linux, Mac OS, Windows, Unix, and so on) and hardware platforms (e.g., any network attached storage (NAS) device, personal video recorders, and so on). Example UPnP AV media servers include PS3 Media Server, Windows Media Connect, GeeXbox, and so on.

The media server 140 stores media, data, and other information in a primary storage location 145 at or attached to the server 140. The primary storage location 145 provides storage for production data generated by the server, as well as a selected number of medial files to be streamed by the content provider. For example, the server 140 may store media that is highly requested (e.g., new movie releases, current television shows, and so on), or is anticipated to be requested by many users, in the primary storage location 145, in order to quickly handle many requests for the media. The media stored may be a number of different types of media. Examples include movies, shows, and other video files, audio files, large images files (e.g. medical images), gaming files, word processing files, illustration files, and other media.

The server 140 also includes a virtual layer 150 that enables the server to create and establish a virtual computing environment in which to provide media stored in other locations and in other types of storage, such as archive storage, to client computing devices 110. The virtual layer 150 communicates with one or more secondary storage devices 160 that store media files on secondary storage media and other non-primary storage types. Further details regarding the virtual layer 150 will be discussed with respect to FIG. 2.

The storage of media on the secondary storage devices 160 is managed and controlled by a data storage system 170, which facilitates the storage of media files to the second storage devices 160 and/or the retrieval/restoration of media files from the second storage devices 160. The data storage system 170 may include a storage manager, one or more data agents, one or more secondary storage devices, one or more storage types, one or more clients, one or more data or information store, a single instancing database, an index, a jobs agent, an interface agent, and a management agent. The data storage system 170 may include components of a modular storage system, such as the CommVault QiNetix system, the CommVault GALAXY backup system, available from CommVault Systems, Inc. of Oceanport, N.J., aspects of which are further described in the commonly-assigned U.S. patent application Ser. No. 09/610,738, now U.S. Pat. No. 7,035,880, the entirety of which is incorporated by reference herein, and/or the CommVault Simpana system, also available from CommVault Systems, Inc.

The data storage system 170 may generally include combinations of hardware and software components associated with performing storage operations on electronic data, such as media files and other content to be streamed to client computing devices. Storage operations include copying, backing up, creating, storing, retrieving, and/or migrating primary storage data (e.g., media files in primary storage location 145) and secondary storage data (which may include, for example, snapshot copies, backup copies, HSM copies, archive copies, and other types of copies of electronic data stored on storage devices). The system 170 may provide one or more integrated management consoles for users or system processes to interface with, in order to perform certain storage operations on electronic data, such as media files. Such integrated management consoles may be displayed at a central control facility or several similar consoles distributed throughout multiple network locations to provide global or geographically specific network data storage information.

In some examples, the transfer of media files from primary to secondary storage may be dictated by storage preferences, for example, as expressed by a user preference, a storage policy, a schedule policy, and/or a retention policy. A "storage policy" is generally a data structure or other information source that includes a set of preferences and other storage criteria associated with performing a storage operation. The preferences and storage criteria may include, but are not limited to, a storage location, relationships between system components, network pathways to utilize in a storage operation, data characteristics, compression or encryption requirements, preferred system components to utilize in a storage operation, a single instancing or variable instancing policy to apply to the data, and/or other criteria relating to a storage operation. For example, a storage policy may indicate that certain media files are to be stored in a certain storage type, retained for a specified period of time before being aged to another storage type, copied to the storage device using a specified number of data streams, and so on.

A data agent may be a software module or part of a software module that is generally responsible for performing storage operations on data within primary storage, such as media files within primary storage location 145, or within other storage locations. 1060/1062 or other memory location. The data storage system may employ multiple data agents, each of which may perform storage operations on data associated with a different application or media type. For example, different individual data agents may be designed to handle video-based data, audio-based data, image-based data, and so on.

A storage manager may be a software module or other application that coordinates and controls storage operations performed by the data storage system 170. The storage manager may communicate with some or all elements of the data storage system, including clients, data agents, secondary storage devices 160, and storage media, to initiate and manage storage operations (e.g., backups, migrations, data recovery operations, and so on). The storage manager may include a jobs agent that monitors the status of some or all storage operations previously performed, currently being performed, or scheduled to be performed by the data storage system. The jobs agent may be communicatively coupled to an interface agent \e.g., a software module or application). The interface agent may include information processing and display software, such as a graphical user interface ("GUI"), an application programming interface ("API"), or other interactive interface through which users and system processes can retrieve information about the status of storage operations. The storage manager may also include a management agent that is typically implemented as a software module or application program. In general, the management agent provides an interface that allows various management agents to communicate with one another.

The storage manager may also maintain an index, a database, or other data structure. The data stored in the index may be used to indicate logical associations between components of the system, user preferences, management tasks, media containerization and data storage information, or other useful data. For example, the storage manager may use data from the index to track logical associations between secondary storage devices 160 and storage media (or movement of data as containerized from primary to secondary storage). Generally speaking, the secondary storage device 160, which may include a media agent, may be implemented as a software module that conveys data, as directed by the data storage system, between the primary storage location 145 and one or more storage media, such as a tape library, a magnetic media storage device, an optical media storage device, a flash media storage device, or any other suitable storage device.

The secondary storage devices 160 may maintain an index, a database, or other data structure that may store index data generated during storage operations for secondary storage (SS) as described herein, including creating a metabase (MB). Thus, the index may indicate where specifically the data is stored in storage media within the secondary storage location 160, what specific files were stored, and other information associated with storage of the data. The secondary storage location 160 may use this index data to quickly and efficiently locate media files that has been previously stored on secondary storage media, such as tapes. This index data may be used for various purposes, such as for retrieving media files via the virtual layer 150 of the media server 140 to be streamed to a client computing device 110.

Thus, unlike conventional systems that can only stream content stored in primary storage locations, the current system provides a computing environment in which content can be stored to and streamed from secondary storage devices, such as magnetic tapes. Further details regarding the virtual layer 150 will now be discussed.

FIG. 2 is a block diagram illustrating the virtualization layer 150 in which aspects of the system may be implemented. In general, virtualization refers to the simultaneous hosting of one or more operating systems on a physical computer. Such virtual operating systems and their associated virtual resources are called virtual machines. Virtualization software sits between the virtual machines and the hardware of the physical computer. One example of virtualization software is ESX Server, by VMware, Inc. of Palo Alto, Calif. Other examples include Microsoft Virtual Server and Microsoft Windows Server Hyper-V, both by Microsoft Corporation of Redmond, Wash., and Sun xVM by Sun Microsystems Inc. of Santa Clara, Calif. Virtualization software provides to each virtual operating system virtual resources, such as a virtual processor, virtual memory, a virtual network device, and a virtual disk. Each virtual machine has one or more virtual disks. Virtualization software typically stores the data of virtual disks in files on the file system of the physical computer, called virtual machine disk files (in the case of VMware virtual servers) or virtual hard disk image files (in the case of Microsoft virtual servers). For example, VMware's ESX Server provides the Virtual Machine File System (VMFS) for the storage of virtual machine disk files. A virtual machine reads data from and writes data to its virtual disk much the same way that an actual physical machine reads data from and writes data to an actual disk.

Referring to FIG. 2, the virtual layer 150 may operate on or be hosted by a computing device, such as the UPnP server 140. The virtual layer 150 may also include or be connected to a virtual data store, such as primary data store disk 216 or secondary data store disk 218, connected to the virtual layer via a storage area network. The virtual layer 150 also includes a virtual machine storage manager 220 operating on or being hosted by another computing device, which may be another server, and a secondary storage data store 222 connected to the computing device. The computing devices may be connected to each other via a network, which may be a LAN, a WAN, the public Internet, some other type of network, and so on.

The virtual layer hosts one or more virtual machines 210. The virtual machine 110 includes an operating system 214 and one or more applications 212 executing on the operating system or loaded on the operating system. The operating system 214 may be any type of operating system, such as Microsoft Windows 95/98/NT/2000/XP/2003/2008/2010, Linux operating systems, Sun Solaris operating systems, UNIX operating systems, Apple OSx, and so on, that can be hosted by the virtual layer 150. The applications 212 may be any applications (e.g., database applications, file server applications mail server applications, web server applications, transaction processing applications, UPnP serving applications, media streaming applications, and so on) that may run on the operating system 214. The virtual machine may also be connected to the various networks described herein.

The operating system 212 may be connected to the virtual storage disks 216, 218 via the SAN, which may be any type of SAN, such as a Fibre Channel SAN, an iSCSI SAN, or any other type of SAN. A primary storage data store may store the virtual disks 216, 218 of the virtual machine 210 hosted by the virtual layer 150. A virtual disk 216, 218 may correspond to one or more files (e.g., one or more *.vmdk or *.vhd files) on the primary storage data store. The primary storage data store may store a primary copy of the data of the virtual machine 210. Additionally or alternatively, the virtual disks 216, 218 may be stored by other storage devices in a data storage system, such as in secondary storage 160 of FIG. 1.

A primary copy of data generally includes a production copy or other "live" version of the data that is used by a software application and is generally in the native format of that application. Primary copy data may be maintained in a local memory or other high-speed storage device (e.g., on the virtual disks 216, 218 located in the primary storage data store) that allows for relatively fast data access, if necessary. Such primary copy data may be intended for short-term retention (e.g., several hours or days) before some or all of the data is stored as one or more secondary copies, for example, to prevent loss of data in the event a problem occurs with the data stored in primary storage.

In contrast, secondary copies include point-in-time data and are typically intended for long-term retention (e.g., weeks, months, or years depending on retention criteria, for example, as specified in a storage or retention policy) before some or all of the data is moved to other storage or discarded. Secondary copies may be indexed so users can browse and restore the data at another point in time. After certain primary copy data is backed up, a pointer or other location indicia, such as a stub, may be placed in the primary copy to indicate the current location of that data. As an example, the secondary storage data store 160 may store one or more secondary copies of the data of the virtual machine 110 or of data (e.g., media files), provided to clients by the UPnP server 140.

The virtual machine storage manager 220 includes a virtual machine storage operation component, which includes a Virtual Logical Unit Number (VLUN) driver for accessing virtual disks 216, 218, and a virtual machine mount component 15 for mounting virtual machines. The virtual machine storage manager 220 also includes a data agent. The data agent includes an integration component that provides functionality for the virtual machine storage operation component. The data agent also includes a virtual disk analyzer component that examines the virtual disk and configuration files corresponding to the virtual disks 216, 218 and extracts metadata from the virtual disk and configuration files. For example, the integration component may include a set of scripts that the data agent causes to be run prior to, during, and/or following a copy of virtual machine data. As another example, the integration component may be a component that encapsulates or wraps the virtual machine mount component and provides an Application Programming Interface (API) with functions for accessing the virtual machine mount component. The virtual machine storage manager 220 also includes a data store 222 that maintains data used by the virtual machine storage manager 220, such as data used during storage operations, and configuration data.

In some examples, a secondary storage computing device may be connected to the virtual machine storage manager 220 and to the secondary storage data store 160. The secondary storage computing device may assist in the transfer of copy data from the virtual machine storage manager 220 to the secondary storage data store 160. The secondary storage computing device may perform functions such as encrypting, compressing, single or variable instancing, and/or indexing data that is transferred to the secondary storage data store 160. In some examples, one or more agents (e.g., a file system agent and/or a proxy host agent) as well as a set of utilities (e.g., VMware Tools if the virtual machine 110 is a VMware virtual machine) may reside on the virtual machine 110 to provide functionality associated with copying and restoring virtual machine data.

Referring back to FIG. 1, the secondary storage data store 160 may be connected to or accessed by the virtual layer 150 via the UPnP server 140. The secondary storage data store 160 may be any type of storage suitable for storing one or more secondary copies of data, such as Directly-Attached Storage (DAS) such as hard disks, storage devices connected via another SAN (e.g., a Fibre Channel SAN, an iSCSI SAN, or any other type of SAN), Network-Attached Storage (NAS), a tape library, optical storage, or any other type of storage. The secondary storage data store 160 stores virtual machine data that is copied by the virtual machine storage manager 220. Accordingly, the secondary storage data store 160 stores one or more secondary copies, of the data of the virtual machine 110. A secondary copy can be in one or more various formats, such as a copy set, a backup set, an archival set, a migration set, and so on.

Virtual disks 216, 218 may have various configurations. As previously described, a virtual disk 216, 218 corresponds to one or more virtual disk files (e.g., one or more *.vmdk or *.vhd files) on a primary storage data store. A virtual layer 150 may support several types of virtual disks 216, 218. For example, a virtual disk may be either: 1) a growable virtual disk contained in a single virtual disk file that can grow in size (e.g., a monolithic sparse virtual disk that starts at 2 GB and grows larger); 2) a growable virtual disk split into multiple virtual disk files (e.g., a split sparse virtual disk comprising multiple 2 GB virtual disk files), the aggregation of which can grow in size by adding new virtual disk files; 3) a preallocated virtual disk contained in a single virtual disk file (e.g., a monolithic flat virtual disk, the size of which does not change); or 4) a preallocated virtual disk split into multiple virtual disk files (e.g., a split flat virtual disk comprising multiple 2 GB virtual disk files, the number of which and the size of each of which does not change). Where a virtual disk is split into multiple virtual disk files, each individual virtual disk file is called an extent. A virtual layer 150 may also support types of virtual disks other than these types. Those of ordinary skill in the art will understand that a virtual disk can be structured in a wide variety of configurations, and that virtual disks are not limited to the configurations described herein.

A virtual layer 150 may support snapshotting, or taking a snapshot of a virtual machine 210. The virtual layer 150 can snapshot a virtual machine 210 in a linear fashion (in which there is only one branch of snapshots from the original state of the virtual machine 210, and each snapshot in the branch linearly progresses from prior snapshots) or in a process tree (in which there are multiple branches of snapshots from the original state of the virtual machine 210, and two snapshots may or may not be in the same branch from the original state of the virtual machine 210). When a snapshot is taken of a virtual machine 210, the virtual machine 210 stops writing to its virtual disks (e.g., stops writing to the one or more *.vmdk files). The virtual machine 210 writes future writes to a delta disk file (e.g., a *delta.vmdk file) using, for example, a copy-on-write (COW) semantic. As the virtual machine layer 150 can snapshot a virtual machine 210 repeatedly, there can be multiple delta disk files. The virtual disk and delta disk files can be analogized to links in a chain. Using this analogy, the original disk file is a first link in the chain. A first child delta disk file is a second link in the chain, and a second child delta disk file is a third link in the chain, and so forth.

Also as previously described, a virtual machine 210 generally has associated configuration files that a virtual layer 150 uses to store configuration data about the virtual machine 210. These configuration files may include a *.vmx file, which stores data about the parent-child relationships created between virtual disk files and delta disk files when a snapshot of a virtual machine 210 is taken. These configuration files may also include a disk descriptor file (e.g., a *.vmdk file). In some examples, instead of using a disk descriptor file, the disk descriptor is embedded into a virtual disk file (e.g., embedded in a *.vmdk file).

The disk descriptor file generally stores data about the virtual disk files that make up a virtual disk 216, 218. This data includes information about the type of the virtual disk. For example, the virtual disk may be a monolithic flat virtual disk, a monolithic sparse virtual disk, a split flat virtual disk, a split sparse virtual disk or another type of a virtual disk. This data also includes an identifier of the parent of the virtual disk file, if it has one (if the virtual machine 210 has been snapshotted, its original virtual disk file will have a child virtual disk file), a disk database describing geometry values for the virtual disk (e.g., cylinders, heads and sectors) and information describing the extents that make up the virtual disk. Each extent may be described by a line in the disk descriptor file having the following format: [type of access] [size] [type] [file name of extent]. Following is an example of a line in the disk descriptor file describing an extent: [0053]RW 16777216 VMFS "test-flat.vmdk." This line describes an extent for which read/write access is allowed, of size 16777216 sectors, of type VMFS (e.g., for use on a primary storage data store), and the filename of the virtual disk file— "test-flat.vmdk."

A virtual layer 150 provides an abstraction layer such that the one or more virtual disks files (and any delta disk files) of the virtual disks 216, 218 appear as one or more actual disks (e.g., one or more hard disk drives) to a virtual machine 210. Because the virtual layer 150 abstracts the virtual disk so that it appears as an actual disk to an operating system 214 executing on the virtual machine 210, the operating system 214 can generally use its standard file system for storing data on a virtual disk 216, 218. The various structures used by the file system and the operating system 214 (e.g., the partition table(s), the volume manager database(s) and the file allocation table(s)) are stored in the one or more virtual disk files that make up a virtual disk.

For example, a virtual layer 150 may store a single virtual disk file (e.g., a single *.vmdk file) that is a preallocated virtual disk (a monolithic flat virtual disk) for each virtual disk used by a virtual machine operating on the virtual layer 150. The single virtual disk file may be named <virtual machine name>-flat.vmdk. There would also be a disk descriptor file for the single virtual disk file that would typically be named <virtual machine name>.vmdk. A snapshot taken of the virtual machine would result in an additional delta disk file being created that is a single virtual disk file (e.g., a single *.vmdk file), which is a growable virtual disk (a monolithic sparse virtual disk). The delta disk file would typically be named <virtual disk name>-<######>-delta.vmdk, where <######> is a number indicating the sequence of the snapshot. There would also be a disk descriptor file for the single virtual disk file that would typically be named <virtual disk name>-<######>-.vmdk, again, where <######> is a number indicating the sequence of the snapshot.

The system may utilize various processes for restoring virtual machine data. In some examples, an component at the UPnP server, such as a media request component 180, may start a process in response to receiving a request to serve a media file by sending an indication to restore virtual machine data to a secondary storage computing device connected to secondary storage 160. The secondary storage computing device accesses an index to locate the virtual machine data, and accesses the secondary storage 160 upon which the virtual machine data is located. The secondary storage computing device restores the data from storage to a specified location, such as to a client 110 via the virtual layer 150. Further details regarding the restoration of media and other files from secondary storage may be found in commonly-assigned U.S. patent application Ser. No. 12/553,294, filed on Sep. 3, 2009, entitled SYSTEMS AND METHODS FOR MANAGEMENT OF VIRTUALIZATION DATA, which is incorporated by reference in its entirety.

Thus, in some examples, a media service, such as a service that streams media over a network to requesting client computers, may utilize the primary storage 145 of the UPnP server 140 for certain media files, such as popular or highly requested media files, and utilize the secondary storage 160, via the virtual layer 150, for other media files, such as less popular or less requested media files, among other things. The service may be transparent with respect to requesting client computers (e.g., clients 110) by serving requests for media stored in secondary storage 160 using the virtual layer 150 while serving requests for media stored primary storage 145 directly. Further details will now be described.

Real-Time Streaming of Content Located in Secondary Storage

Figure 3:
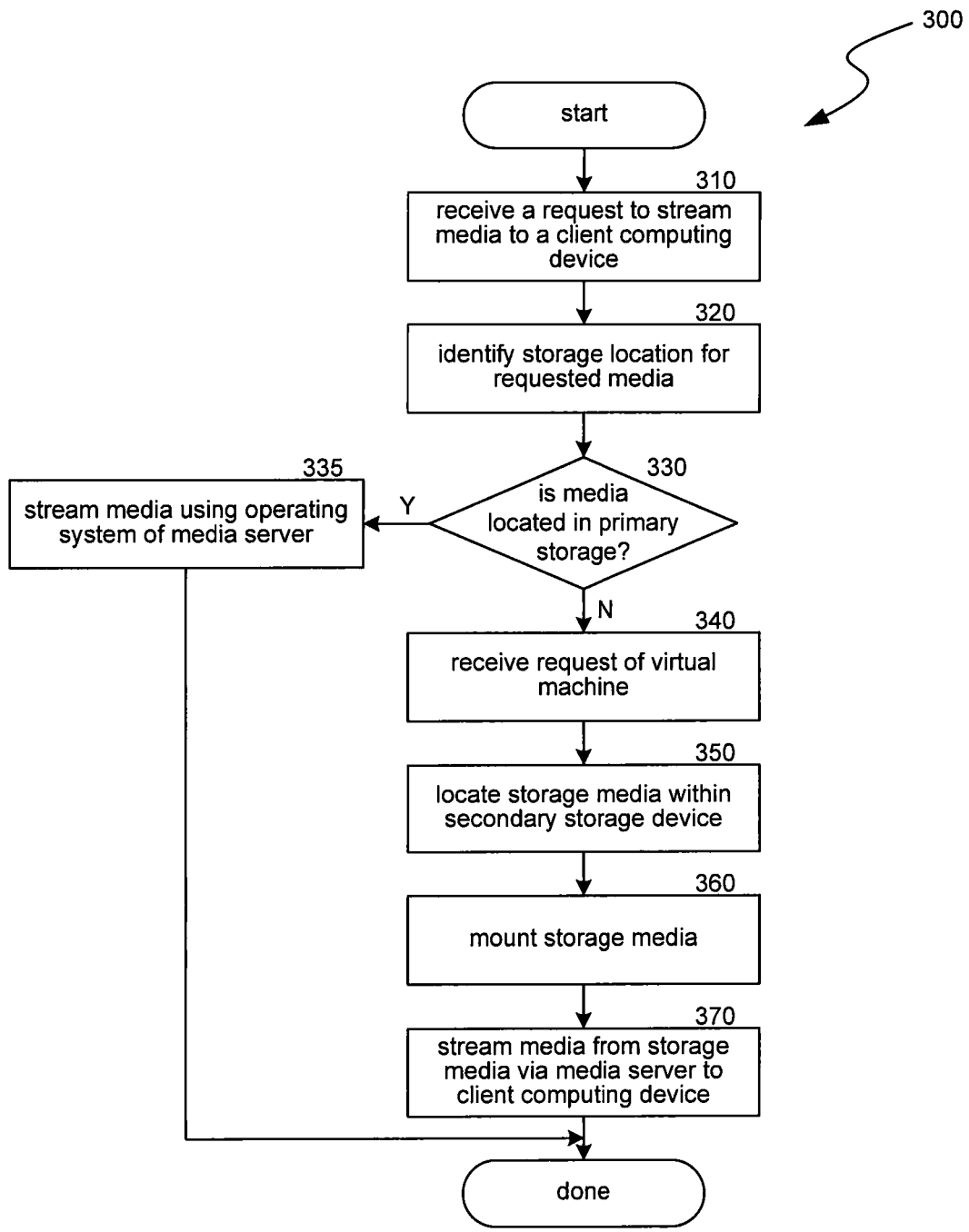
FIG. 3 is a flow diagram illustrating a routine for streaming media files from a Universal Plug and Play (UPnP) server to a client computing device.

As discussed herein, the system enables the real-time streaming of media located in secondary storage to requesting client computers. FIG. 3 is a flow diagram illustrating a routine 300 for streaming media files from a Universal Plug and Play (UPnP) server to a client computing device. In step 310, the system receives a request to stream or transfer media to a client computing device. For example, the system, via a media server such as a UPnP server, receives a request from a client computing device 110 via a network 130, such as the Internet. The request may be first received at the client computing device 110 by a user interface 115, such as a web browser 115 displaying a list of media made available by a media service utilizing the system.

In step 320, the system identifies a storage location for the requested media. For example, a media request component 180 may include a location identification component or other component configured to review an index or other data structure that indicates the storage location for the requested media file. The location identification component may review indices associated with primary storage, such as primary storage 145, indices associated with secondary storage, such as secondary storage 160, and/or indices associated with other storage locations.

In step 330, the system determines whether the requested media is located on primary storage, such as primary storage 145. When the requested media is located on primary storage, routine 300 proceeds to step 335 and the systems provides the requested media via components of the operating system of the media server. For example, the system may stream the media using components of the UPnP server 140. When the requested media is located on secondary storage, routine 300 proceeds to step 340, and the request is received at a virtual machine within a virtual computing environment hosted by the media server.

After the request is received by the virtual machine, the system, in step 350 locates the requested media within secondary storage, such as within archive storage. For example, an identification component may review an index associated with secondary storage locations to locate the media file within secondary storage 160.

In step 360, the system mounts the storage media containing the requested media file to the virtual machine. For example, the system mounts a magnetic tape or optical disk storing the media file in secondary storage to the operating system 214 of the virtual machine 210.

In step 370, the system provides the requested media to the requested client computing device via the virtual computing environment. For example, the system accesses and streams in real-time some or all of the requested media file to the client computing device 210 via the operating system 214 of the virtual machine 210.

Thus, in some examples, the system enables the real-time streaming of content over a network to a client computing device regardless of whether the content is located in the primary data store of a media server or located in an associated secondary data store of a media server. That is, by serving requests for media stored in the primary data store directly from the primary data store and serving requests for media stored in the secondary data store directly via a virtual computing environment accessing the secondary data store, the system may provide real-time access to media, regardless of where the media is located in a data storage system, among other benefits.

Figure 4:
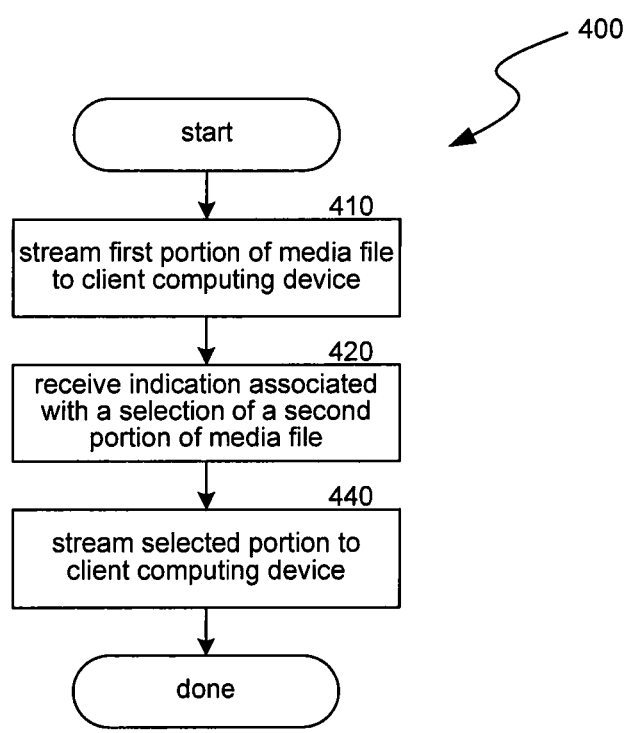
FIG. 4 is a flow diagram illustrating a routine for streaming sections of a media file to a client computing device.

In some examples, the system may transfer and/or stream one or more portions of a media file in response to receiving a request for a media file. FIG. 4 is a flow diagram illustrating a routine 400 for streaming sections of a media file to a client computing device. In step 410, the system streams a first portion of a media file to a client computing device. For example, the UPnP server 140 accesses a first portion of a media file located in secondary storage 160 via a virtual layer 150, and transfers the first portion (e.g., the first 5 minutes of a 2 hour movie file) to client computing device 110.

In some cases, the request includes an action to be performed within a media file, such as an action to play a media file, an action to forward to a specific position in a media file, an action to rewind to a specific position in a media file, an action to seek to a specific position in a media file, and so on. Thus, the system, via the media server, may stream a portion associated with an action to be performed, such as a section in a middle of a media file.

In step 420, the system receives an indication associated with a selection of a second portion of the requested media file. For example, the system may receive a request to seek to a later section of a media file, such as a later chapter in a movie or a later image in a large image file.

In step 430, the system accesses the location of the requested second portion and streams the selected portion to a client computing device. For example, the system locates the second portion within secondary storage (i.e., a tape offset for the portion of the media file), via the virtual layer, and streams the media file starting at the located second portion to the client computing device 110 using the UPnP server 140.

In some cases, the system may stream a media file stored in secondary storage via a virtual layer in two or more sections or portions of the media file. For example, in response to receiving a request to play a media file, the system may stream an initial portion of the media file, periodically accessing and serving up subsequent portions of the media file during playback of the media file. That is, instead of serving up an entire medial file in real-time, in some cases the system accesses and streams subsequent portions of the media file unless receiving an indication otherwise. Such segmented accessing and streaming of media files may avoid loading and running an entire large media file unnecessarily, among other benefits.

Figure 5:
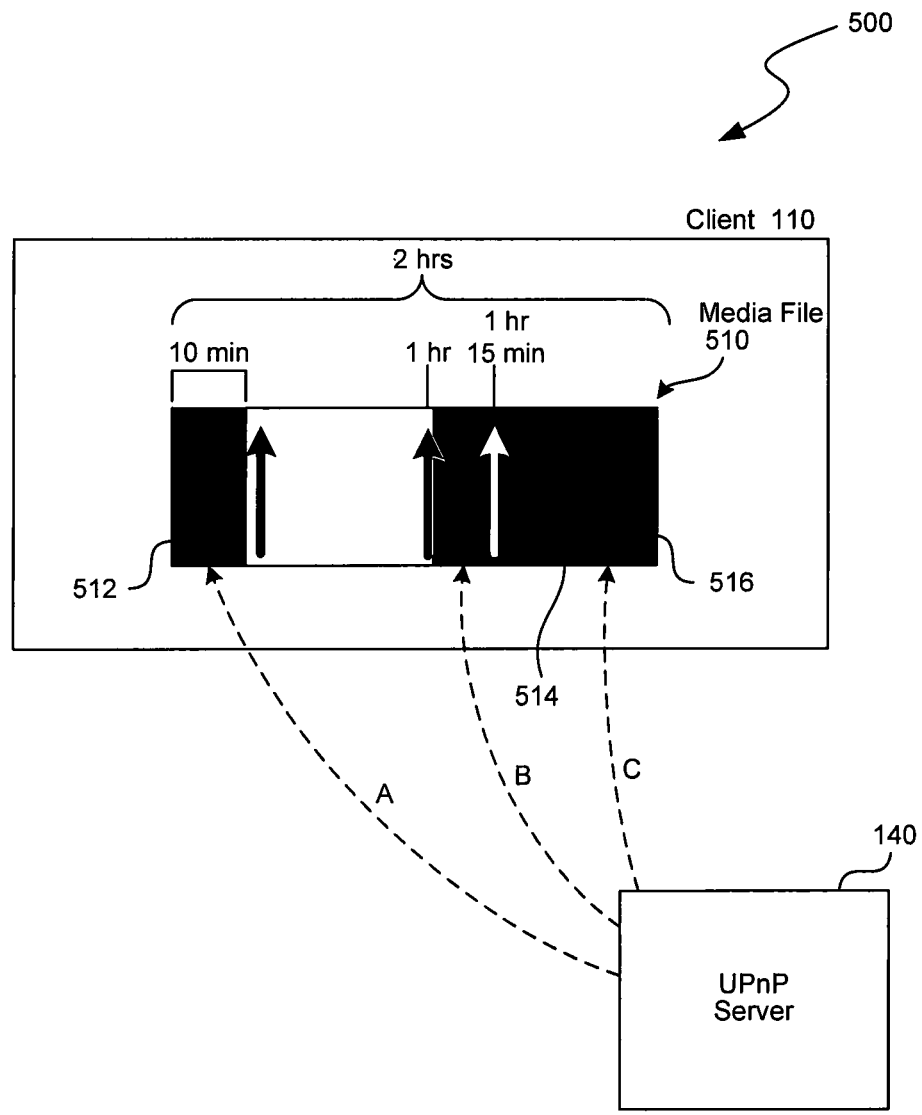
FIG. 5 is a schematic diagram illustrating sectioned streaming of a media file.

FIG. 5 is a schematic diagram 500 illustrating sectioned streaming of a media file. A UPnP server 140 may stream a movie file 510 having a duration of two hours. During a first instance A, upon receiving a request for the media file 510 (e.g., receiving a request from a user at a client computing device 110 to play a movie) the UPnP server 140 accesses a first portion 512 of the media file 510 from secondary storage and streams the first portion 512 to the client computing device 110. During a second instance B, upon receiving a request to go to a later section of the media file 510 (e.g., receiving a request to seek to a portion of a movie an hour into the movie), the UPnP server 140 accesses a second portion 514 of the media file 510 from secondary storage and streams the second portion 514 to the client computing device 110. During a third instance C, without receiving an additional request from the client computing device 110 (e.g., a user wants to continue playback of the movie), the UPnP server 140 automatically accesses a third subsequent portion 516 of the media file 510 from secondary storage and streams the third portion 516 to the client computing device 110.

Figure 6:
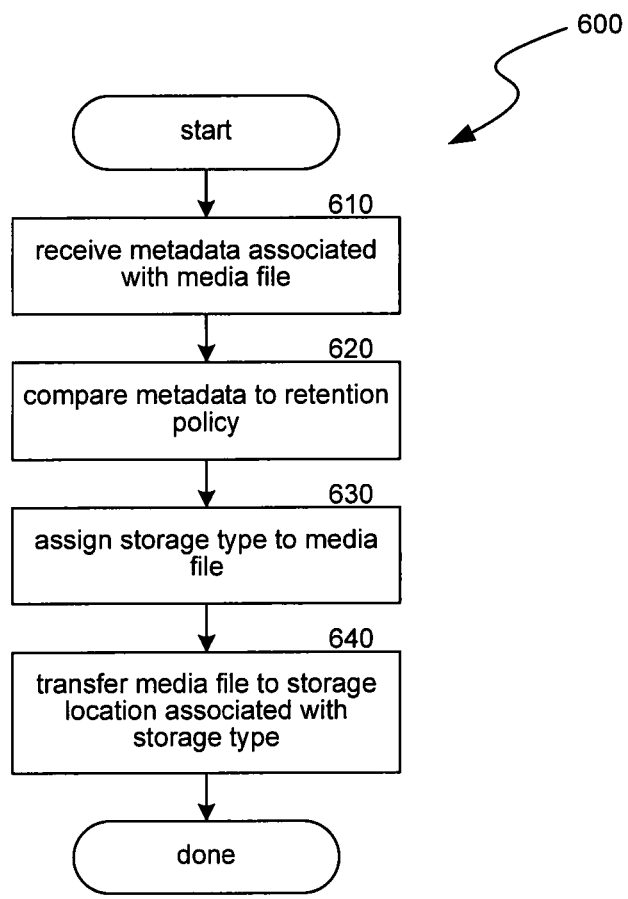
FIG. 6 is a flow diagram illustrating a routine for managing media content between storage devices.

In some examples, the system may facilitate the movement of media between storage devices. Although the system is capable of accessing and streaming in real-time media files regardless of where the media files are stored, there may be times when it is beneficial to a media service provider to automatically transfer media between primary and secondary storage, depending on the popularity of the media files, the use or anticipated use of the media files, or other factors. FIG. 6 is a flow diagram illustrating a routine 600 for managing media content between storage devices.

In step 610, the system receives metadata associated with a media file. For example, the system may receive information associated with a number of users requesting a media file, information associated with a time period in which the media file was previously accessed, information associated with an anticipated use of a media file, information associated with access of similar media files, and so on. Such information based be stored in a data structure, such as a table relating media files with various associated metadata.

In step 620, the system compares the received metadata with a retention policy. The system may compare the received metadata with retention rules, retention threshold values, and so on. For example, the system may compare information that a certain media file has not been requested and/or accessed for 6 months or nor accessed a certain number of times in the time period, and compare the information with a retention policy instructing the system to transfer any media files not accessed with a previous 6 month period to secondary storage.

In step 630, the system assigns a storage type to the media file based on the comparison. Thus, following the example, the media file that has not been requested for 6 months does not satisfy a retention policy associated with primary storage, and is assigned to secondary storage. In step 640, the system transfers the media file to a storage location associated with the assigned storage type. For example, the system, via data storage component 170, transfers the media file from primary storage to a secondary storage location, such as a magnetic tape.

Thus, because the system is capable of streaming media using a UPnP server regardless of where the media is located, the system may intelligently and/or automatically transfer media files between storage locations based on a number of criteria. Such management of media may improve the costs associated with hosting media, among other benefits.

The following examples illustrate a few real world applications of the system. One of ordinary skill will appreciate that other scenarios are of course possible. As a first scenario, a user of a popular streaming media service (e.g., Netflix, iTunes, Ondemand, and so on), launches her browser to watch a movie via the service. The service displays the movies available at the service, listing movies stored in both primary and secondary storage at servers of the service. The user selects a movie that is stored in secondary storage. A UPnP server of the service locates the movie via a virtual layer, and streams the movie in portions to the user.

As another scenario, a doctor is reviewing old MRI images with a patient. The doctor wishes to look at the $54^{th}$ image of 200 images, and selects the image for viewing. At a server hosting the images, a media server, via a virtual layer, locates the media hosting the $54^{th}$ image at a certain tape and offset, and serves the image to the doctor's computer.

CONCLUSION

From the foregoing, it will be appreciated that specific embodiments of the system have been described herein for purposes of illustration, but that various modifications may be made without deviating from the spirit and scope of the system. Accordingly, the system is not limited except as by the appended claims.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the system provided herein can be applied to other systems, not necessarily the system described above. The elements and acts of the various embodiments described above can be combined to provide further embodiments.

These and other changes can be made to the system in light of the above Detailed Description. While the above description details certain embodiments of the system and describes the best mode contemplated, no matter how detailed the above appears in text, the system can be practiced in many ways. Details of the system may vary considerably in implementation details, while still being encompassed by the system disclosed herein. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific embodiments disclosed in the specification, unless the above Detailed Description section explicitly defines such terms. Accordingly, the actual scope of the system encompasses not only the disclosed embodiments, but also all equivalent ways of practicing or implementing the system under the claims.

While certain aspects of the system are presented below in certain claim forms, the inventors contemplate the various aspects of the system in any number of claim forms. For example, while only one aspect of the system is recited as embodied in a computer-readable medium, other aspects may likewise be embodied in a computer-readable medium. Accordingly, the inventors reserve the right to add additional claims after filing the application to pursue such additional claim forms for other aspects of the system.

I claim:

1. A method performed by a media server comprising a primary storage for streaming media to a client computing device over a network, the method comprising:
   receiving a request for a media file at the media server,
      wherein the media server hosts a virtual layer comprising one or more virtual machines,
      wherein each virtual machine includes a corresponding operating system;
      wherein the virtual layer further includes a virtual machine storage manager hosted on a computing device different from the media server;
   determining that a storage location of the requested media file is a secondary storage location and not the primary storage,
      wherein the requested media file is stored in a backup format at the secondary storage location,
      wherein the secondary storage location includes a secondary data storage drive coupled to the network; and
      wherein the secondary data storage drive includes an index that stores index data generated during storage of data to the secondary data storage device,
      wherein the index includes an indication of specific files being stored during the storage of data;
   mounting the secondary storage drive to a virtual machine of the virtual layer;
   accessing the media file via the virtual machine; and transferring a portion of the media file from the secondary storage location, via the virtual layer, to the client computing device;
    wherein the primary storage includes a stub that indicates the secondary storage location of the requested media file.

2. The method of claim 1, wherein receiving a request for a media file at the media server includes receiving a request for a media file at a Universal Plug and Play (UPnP) server, wherein the UPnP server includes multiple UPnP serving applications executed by the one or more virtual machines.

3. The method of claim 1, wherein transferring the media file to the client computing device includes transferring a first portion of the media file to the client computing device upon accessing the media file and automatically transferring a second portion of the media file to the client computing device in response to continued playback of the media file at the client computing device.

4. The method of claim 1, wherein transferring the media file to the client computing device includes transferring a first portion of the media file to the client computing device upon accessing the media file and transferring a second portion of the media file to the client computing device in response to an action performed in the medial file at the client computing device.

5. The method of claim 1, wherein transferring the media file to the client computing device includes transferring a portion of the media file to the client computing device.

6. The method of claim 1, wherein the media file is an archive file stored at the secondary storage location.

7. The method of claim 1, wherein transferring the media file to the client computing device includes:
    streaming a first portion of a movie to the client computing device; and
    streaming a second portion of the movie to the client computing device in response to a selection of the second portion at the client computing device.

8. The method of claim 1, wherein transferring the media file to the client computing device includes:
    transferring a first image of an image file to the client computing device; and
    transferring a second image of the image file to the client computing device in response to a selection of the second image at the client computing device.

9. The method of claim 1, wherein accessing the media file via a virtual layer hosted by the media server includes establishing a virtual environment to the media server that enables access to media files stored in the secondary storage location.

10. A non-transitory computer-readable medium whose contents, when executed by a media server, cause the media server to perform a method for streaming media to a client computing device, the method comprising:
    receiving a request from a client computing device to stream a media file,
        wherein the media server hosts a virtual layer comprising one or more virtual machines, and
        wherein each virtual machine includes a corresponding operating system;
        wherein the virtual layer further includes a virtual machine storage manager hosted on a computing device different from the media server;
    determining that the requested media file is not stored in primary storage associated with the media server but is stored at a secondary storage location in which the requested media file is stored in a backup format;
        wherein the requested media file is stored in a backup format at the secondary storage location,
        wherein the secondary storage location includes a secondary data storage drive coupled to the network; and
        wherein the secondary data storage drive includes an index that stores index data generated during storage of data to the secondary data storage device,
        wherein the index includes an indication of specific files being stored during the storage of data;
    mounting the secondary storage drive to a virtual machine of the virtual layer; and
    accessing the requested media file via the virtual machine;
        wherein the primary storage includes a stub that indicates the secondary storage location of the requested media file.

11. The computer-readable medium of claim 10, further comprising:
    transferring the requested media file from a secondary storage device storing the media file to the client computing device using components of the media server.

12. The computer-readable medium of claim 10, further comprising:
    mounting a secondary storage device storing the media file to virtual computing environment; and
    transferring the requested media file from the secondary storage device storing the media file to the client computing device using components of the media server.

13. The computer-readable medium of claim 10, further comprising:
    streaming a first portion of the requested media file from a secondary storage device storing the media file to the client computing device using components of the media server;
    receiving a request from the client computing device associated with a performed action in the streamed media file;
    accessing a second portion associated with the performed action of the requested media file via the virtual computing environment hosted by the media server; and
    streaming the second portion of the requested media file from the secondary storage device storing the media file to the client computing device using components of the media server.

14. The computer-readable medium of claim 10, wherein the media file is a multimedia file.

15. The computer-readable medium of claim 10, wherein the media file is an image file.

16. A system for streaming media to a client computing device, the system comprising:
    a universal plug and play server, wherein the universal plug and play server is configured to stream media over a network to a client computing device;
    a plurality of virtual machines hosted by the universal plug and play server,
        wherein a virtual machine of the plurality of virtual machines comprises an operating system different from that of the universal plug and play server,
        wherein each of the plurality of virtual machines executes a media streaming application; and
        wherein the virtual machine is configured to provide media stored in secondary storage locations to the universal plug and play server; and
    a media request component, where the media request component is configured to:
        identify locations of media requested by a client computing device; and
        when the requested media is located in primary storage locations of the universal plug and play sever, direct the universal plug and play server to stream the requested media from the primary storage locations to the client computing device; and when the requested media is located in secondary storage locations associated with the universal plug and play server, direct the universal plug and play server to access the requested media using the virtual machine and stream a portion the requested media from the secondary storage locations to the client computing device;

wherein the requested media is stored in a backup format at the secondary storage location, wherein the secondary storage location includes a secondary data storage drive coupled to the network;

wherein the secondary storage drive is mounted to the virtual machine for accessing the media file via the virtual machine;

wherein the secondary data storage drive includes an index that stores index data generated during storage to the secondary data storage device, wherein the index includes an indication of specific files being stored during the storage of data; and wherein, when the requested media is in the secondary storage location, the primary storage includes a stub that indicates the secondary storage location of the requested media.

17. The system of claim 16, wherein the universal plug and play server is accessed by the client computing device via the Internet.

18. The system of claim 16, wherein at least one of the secondary storage locations is a tape library.

19. A computer-implemented method for managing storage of media files for a streaming media service, the method comprising:

comparing, by a computer, metadata associated with a media file to a retention policy for maintaining media hosted by the streaming media service in primary storage;

determining that the metadata of the media file does not satisfy the retention policy for maintaining media hosted by the streaming media service in primary storage; and transferring the media file to secondary storage and make the media file in the secondary storage accessible via a virtual computing environment hosted by a media server of the streaming media service, wherein the virtual computing environment comprise one or more virtual machines, each virtual machine including a corresponding operating system;

wherein the requested media file is stored in a backup format at the secondary storage location, wherein the secondary storage location includes a secondary data storage drive coupled to the network;

wherein the secondary storage drive is mounted to a virtual machine for accessing the media file via the virtual machine;

wherein the secondary data storage drive includes an index that stores index data generated during storage to the secondary data storage device, wherein the index includes an indication of specific files being stored during the storage of data; and wherein the primary storage includes a stub that indicates the secondary storage location of the requested media file.

20. The method of claim 19, wherein transferring the media file to secondary storage includes transferring the media file to secondary storage capable of being accessed by the streaming media server via a virtual computing environment hosted by a media server of the streaming media service.

21. The method of claim 19, wherein determining that the metadata of the media file does not satisfy the retention policy for maintaining media hosted by the streaming media service in primary storage includes determining that the media file has not been accessed within a certain time period.

22. The method of claim 19, wherein determining that the metadata of the media file does not satisfy the retention policy for maintaining media hosted by the streaming media service in primary storage includes determining that the media file has not been accessed a threshold number of times within a certain time period.

* * * * *

UNITED STATES PATENT AND TRADEMARK OFFICE
CERTIFICATE OF CORRECTION

| | |
|---|---|
| PATENT NO. | : 8,706,867 B2 |
| APPLICATION NO. | : 13/076740 |
| DATED | : April 22, 2014 |
| INVENTOR(S) | : Vijayan |

It is certified that error appears in the above-identified patent and that said Letters Patent is hereby corrected as shown below:

In the Specification

Column 1, line 33, delete "the a" and insert -- a --, therefor.

Signed and Sealed this
Fifth Day of August, 2014

Michelle K. Lee
*Deputy Director of the United States Patent and Trademark Office*